(12) United States Patent
Chen et al.

(10) Patent No.: US 11,953,802 B2
(45) Date of Patent: Apr. 9, 2024

(54) OPTICAL SWITCH EMPLOYING A VIRTUALLY IMAGED PHASE-ARRAY DISPERSER

(71) Applicant: Nokia Solutions and Networks OY, Espoo (FI)

(72) Inventors: Haoshuo Chen, Aberdeen, NJ (US); Nicolas Fontaine, Keyport, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 463 days.

(21) Appl. No.: 17/104,736

(22) Filed: Nov. 25, 2020

(65) Prior Publication Data

US 2022/0163865 A1    May 26, 2022

(51) Int. Cl.
*G02F 1/31* (2006.01)
*G02B 1/11* (2015.01)
(Continued)

(52) U.S. Cl.
CPC .............. *G02F 1/31* (2013.01); *G02B 1/11* (2013.01); *G02B 6/29367* (2013.01);
(Continued)

(58) Field of Classification Search
CPC ........ G02F 1/31; G02F 1/292; G02F 2203/24; G02B 1/11; G02B 6/29367; G02B 6/2938;
(Continued)

(56) References Cited

U.S. PATENT DOCUMENTS 5,987,050 A * 11/1999 Doerr ..................... H01S 5/026
372/98
9,188,831 B2    11/2015 Neilson et al.
(Continued)

OTHER PUBLICATIONS

Iwakuni, Kana, et al. "Direct frequency comb spectroscopy with an immersion grating." 2019 Conference on Lasers and Electro-Optics Europe & European Quantum Electronics Conference (CLEO/Europe-EQEC), IEEE, Munich, Germany (2019): 1 page.
(Continued)

*Primary Examiner* — Audrey Y Chang
(74) *Attorney, Agent, or Firm* — Mendelsohn Dunleavy, P.C.; Steve Mendelsohn

(57) ABSTRACT

A WSS device in which a VIPA is used as a spectral disperser. In an example embodiment, the VIPA is configured to produce two or more diffraction orders on the LCOS micro-display of the WSS device. The LCOS micro-display is configurable to independently process light corresponding to different diffraction orders. For example, the LCOS micro-display may be used to implement: (i) optical-signal switching by applying different relative phase shifts to light of different diffraction orders to cause constructive interference at a selected one of the optical ports of the WSS device; (ii) optical-signal splitting by steering light of different diffraction orders to at least two different selected optical ports of the WSS device; and (iii) controllable optical-signal attenuation by applying different relative phase shifts to different diffraction orders to control the relative degree of constructive and destructive interference at a selected one of the optical ports of the WSS device.

19 Claims, 11 Drawing Sheets

(51) Int. Cl.
  G02B 6/293    (2006.01)
  G02B 17/00    (2006.01)
  G02B 27/00    (2006.01)
  G02F 1/29     (2006.01)
  G03H 1/22     (2006.01)
(52) U.S. Cl.
  CPC ....... G02B 6/2938 (2013.01); G02B 6/29395 (2013.01); G02B 17/004 (2013.01); G02B 27/0087 (2013.01); G02F 1/292 (2013.01); G03H 1/2294 (2013.01); *G02F 2203/24* (2013.01); *G03H 2225/22* (2013.01)
(58) Field of Classification Search
  CPC .............. G02B 6/29395; G02B 17/004; G02B 27/0087; G02B 26/0833; G03H 1/2294; G03H 2225/22
  USPC .......................... 398/81, 83, 115; 385/24, 17
  See application file for complete search history.

(56) References Cited

U.S. PATENT DOCUMENTS

| | | | |
|---|---|---|---|
| 9,225,458 B2 | 12/2015 | Darling et al. | |
| 9,369,783 B2 | 6/2016 | Neilson et al. | |
| 10,073,221 B2 | 9/2018 | Fontaine et al. | |
| 2003/0128917 A1 | 7/2003 | Turpin et al. | |
| 2004/0184724 A1* | 9/2004 | Izumi | G02B 6/29394 385/27 |
| 2006/0067611 A1* | 3/2006 | Frisken | G02B 6/2793 385/16 |
| 2008/0031627 A1* | 2/2008 | Smith | G02B 6/29313 398/83 |
| 2008/0089698 A1 | 4/2008 | Jiang et al. | |
| 2009/0297155 A1* | 12/2009 | Weiner | H04B 10/00 398/115 |
| 2009/0317085 A1* | 12/2009 | Izumi | G02B 6/29358 398/81 |
| 2012/0002917 A1* | 1/2012 | Colbourne | G02B 6/356 385/17 |
| 2013/0215431 A1 | 8/2013 | Ellerbee | |
| 2014/0348464 A1* | 11/2014 | Kamura | G02B 6/3588 385/24 |

OTHER PUBLICATIONS

Supradeepa, V. R., et al. "A 2-D VIPA-grating pulse shaper with a liquid crystal on silicon (LCOS) spatial light modulator for broadband, high resolution, programmable amplitude and phase control." 2010 23rd Annual Meeting of the IEEE Photonics Society, Denver, Colorado (2010): 494:495.

\* cited by examiner $O_{m-1} \rightarrow$ $O_m \rightarrow$ $O_{m-1} \rightarrow$ $O_m \rightarrow$

OPTICAL SWITCH EMPLOYING A VIRTUALLY IMAGED PHASE-ARRAY DISPERSER

BACKGROUND

Field

Various example embodiments relate to optical communication equipment and, more specifically but not exclusively, to optical switches.

Description of the Related Art

This section introduces aspects that may help facilitate a better understanding of the disclosure. Accordingly, the statements of this section are to be read in this light and are not to be understood as admissions about what is in the prior art or what is not in the prior art.

An optical cross-connect (OXC) switch is an optical device that is used, e.g., by telecommunications carriers, to switch optical signals in a fiber-optic network. A representative N×M OXC switch interconnects any of its N optical input ports to any of its M optical output ports in an optically transparent fashion, where N and M are positive integers, and at least one of N and M is greater than one. The telecommunications industry develops, manufactures, sells, deploys, and services a large variety of OXC switches.

SUMMARY OF SOME SPECIFIC EMBODIMENTS

Disclosed herein are various embodiments of a wavelength-selective-switch (WSS) device in which a virtually imaged phase array (VIPA) is used as a spectral disperser. In an example embodiment, the VIPA disperser is configured to produce two or more diffraction orders on the liquid-crystal-on-silicon (LCOS) micro-display of the WSS device. The LCOS micro-display is configurable to independently process light corresponding to different diffraction orders. For example, the LCOS micro-display may be used to implement: (i) optical-signal switching by applying different relative phase shifts to light of different diffraction orders to cause mainly constructive interference at a selected one of the optical ports of the WSS device; (ii) optical-signal splitting by steering light of different diffraction orders to at least two different selected optical ports of the WSS device; and (iii) controllable optical-signal attenuation by applying different relative phase shifts to different diffraction orders to control the relative degree of constructive and destructive interference at a selected one of the optical ports of the WSS device.

Some embodiments of the disclosed WSS device are advantageously capable of achieving a spectral resolution finer than approximately 1 GHz.

Some embodiments of the disclosed WSS device are advantageously capable of independently performing optical-signal switching and controllable optical-signal attenuation.

According to an example embodiment, provided is an apparatus, comprising: an array of optical ports including a first optical port and a plurality of second optical ports; a beam-steering device optically coupled to the array of optical ports and having a beam-steering surface including a plurality of configurable pixels; and a virtually imaged phase-array (VIPA) disperser optically coupled between the array of optical ports and the beam-steering device; and wherein the apparatus is configurable to selectively route a plurality of wavelength channels between the first optical port and a selected set of the second optical ports by way of the VIPA disperser and the beam-steering surface.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Some embodiments may benefit from at least some features disclosed in U.S. Pat. Nos. 9,188,831, 9,225,458, 9,369,783, and 10,073,221, all of which are incorporated herein by reference in their entirety.

A wavelength-selective switch (WSS) is an OXC switch that operates on wavelength-division-multiplexed (WDM) signals without having to fully physically demultiplex their constituent WDM components, e.g., into individual dedicated ports. A WSS can be used, for example, to implement a reconfigurable optical add/drop multiplexer (ROADM). In some cases, substantially the same device architecture can be used to implement both a WSS and a ROADM, with the classification of the resulting physical device as the former or the latter depending mostly on the degree of switching enabled by such physical device. An optical-WDM network employing WSS and/or ROADM devices has many attractive features that help to accelerate service deployment, accelerate rerouting around points of failure in the network, reduce capital and operating expenses for the service provider, and provide a network topology that is amenable to future network upgrades. Currently, there is a high market demand for OXC switches, WSS devices, and ROADM devices that have one or more, and possibly all, of the following beneficial characteristics: (i) low production cost; (ii) small form factor; (iii) high port count; (iv) fine spectral resolution, e.g., smaller than 10 GHz; (v) high switching speed; (vi) controllable per-channel attenuation; and (vii) low insertion loss.

A WSS typically employs a reconfigurable beam-steering device to optically connect the selected sets of input and output optical ports in a wavelength-dependent manner Some WSS systems employ two-dimensional pixelated MEMS mirror arrays as beam-steering devices. Some other WSS systems employ liquid-crystal-on-silicon (LCOS) micro-displays as beam-steering devices. In a MEMS implementation of the beam-steering device, the MEMS mirrors in the array can be controllably tilted to steer the corresponding sub-beams in the respective intended directions. In an LCOS implementation of the beam-steering device, the phase shift imparted onto the corresponding optical beam by the individual pixels of the micro-display can be appropriately controlled to create approximately linear optical-phase retardation in the direction of the intended deflection of the diffracted beam. In some cases, MEMS mirror arrays and LCOS micro-displays may be interchangeable to provide substantially the same beam-steering functions.

Figure 1:
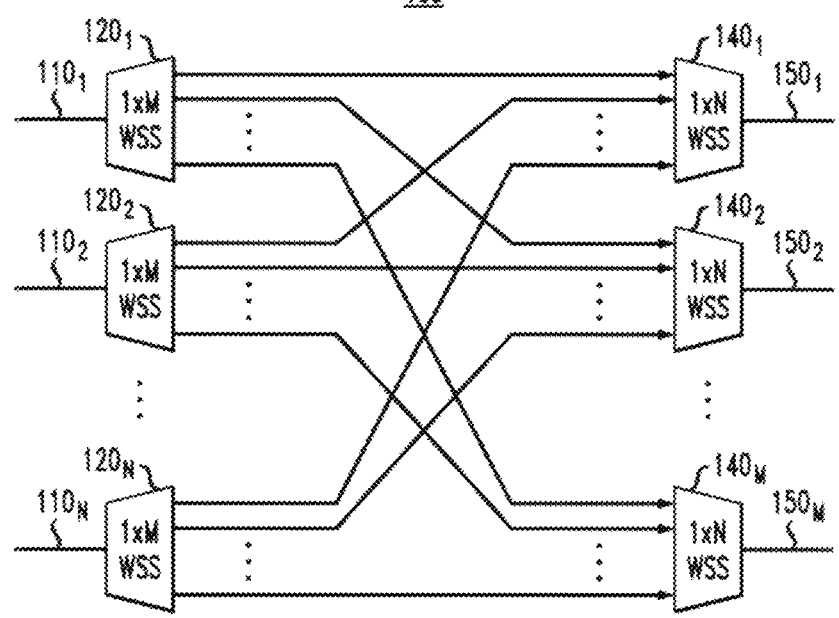
FIG. 1 shows a block diagram of a wavelength-selective-switch (WSS) device in which at least some embodiments can be practiced.
Figure 2:
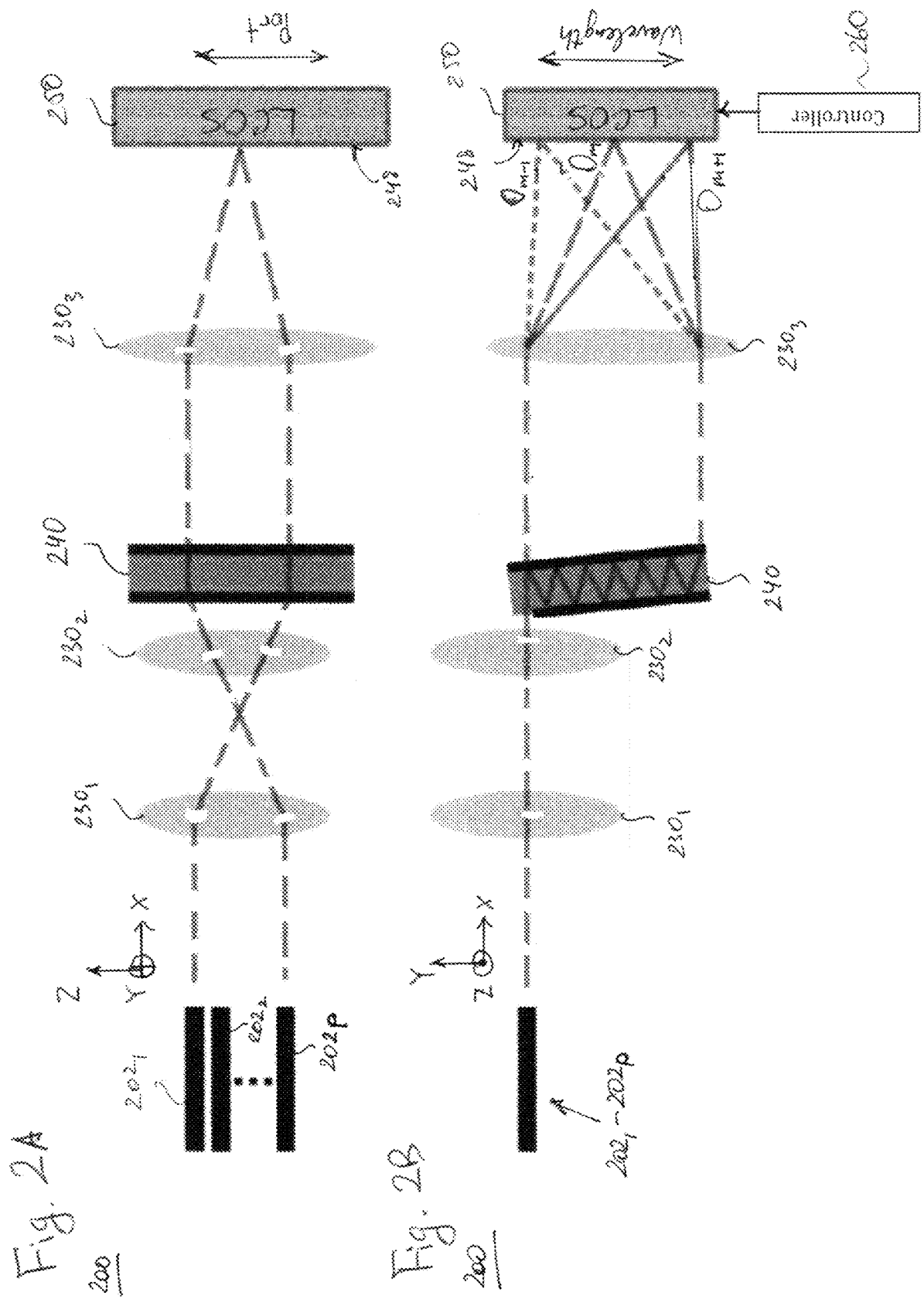
FIGS. 2A-2B show schematic views of a wavelength-selective switch that can be used in the WSS device of FIG. 1 according to an embodiment.

FIG. 1 shows a block diagram of a WSS device 100 in which at least some embodiments may be practiced. Device 100 has N optical input ports $110_1$-$110_N$ and M optical output ports $150_1$-$150_M$, where N and M are (either the same or different) integers greater than one. Each of optical input ports 110 and optical output ports 150 may have an appropriate connector for end-connecting a respective optical fiber (not explicitly shown in FIG. 1). In operation, each of these optical fibers may transport a respective optical WDM signal. In principle, each of the transported WDM signals can have an arbitrary number of WDM components (e.g., modulated carrier wavelengths or optical channels), with the total number K of unique carrier wavelengths that are being handled by device 100 being independent of the numbers N and/or M.

Device 100 comprises N (1×M) wavelength-selective switches $120_1$-$120_N$ and M (1×N) wavelength-selective switches $140_1$-$140_M$, interconnected as shown in FIG. 1. A 1×N wavelength-selective switch is typically a (re)configurable optical multiplexer/demultiplexer that can be configured to route the full set or a selected subset of the K carrier wavelengths between the common port thereof and a variety of its N ports. As used herein, the term "common port" refers to a port having the following features of a 1×N wavelength-selective switch. When an input port, a common port can be configured to variously distribute the received carrier wavelengths among the N ports such that different ones of the N ports internally receive and externally output different subsets of the K carrier wavelengths. One of the possible switch configurations can be such that all wavelengths externally applied to the common port go to a single one of the N ports while others of the N ports receive no carrier wavelengths from the common port. When an output port, a common port can internally collect and externally output up to K carrier wavelengths from the different N ports such that different ones of the N ports contribute different subsets of the K wavelengths. Again, one of the possible switch configurations can be such that all carrier wavelengths collected by the common port originate from a single one of the N ports while other ones of the N ports contribute no carrier wavelengths to the common port. It is customary to depict a 1×N WSS using a block diagram in which (i) the common port is shown at the side having a single port (e.g., see FIG. 1) and (ii) each of the N ports is shown as being located at the side having the N ports (also see FIG. 1), but the actual physical locations of the N+1 ports of such a 1×N WSS may be different (e.g., see FIG. 3).

In device 100, each wavelength-selective switch $120_i$ has its common port optically coupled to the corresponding input port $110_i$. Similarly, each wavelength-selective switch $140_j$ has its common port optically coupled to the corresponding output port $150_j$. The sets of M ports of the 1×M wavelength-selective switches $120_1$-$120_N$ are optically coupled to the sets of N ports of the 1×N wavelength-selective switches $140_1$-$140_M$ as indicated in FIG. 1. The latter connections can be implemented through free space, e.g., with mirrors and lenses, or through optical fibers or on-board optical waveguides.

Each 1×M wavelength-selective switch 120 is configured to operate as a configurable demultiplexer that routes optical signals from the common input port to various ones of the M output ports. Each 1×N wavelength-selective switch 140 is configured to operate as a configurable multiplexer that routes optical signals from various ones of the N input ports to the common output port. Using the routing characteristics of wavelength-selective switches 120 and 140, device 100 is capable of directing any carrier wavelength or any set of two or more carrier wavelengths from any input port 110 to any output port 150. In operation, device 100 may employ a switch controller (not explicitly shown in FIG. 1) that is connected to control the routing configurations of the 1×M and 1×N wavelength-selective switches $120_1$-$120_N$ and $140_1$-$140_M$. The controller may use appropriate routing algorithms, e.g., to avoid signal collisions at any of output ports $150_1$-$150_M$, with a collision being an event in which two different optical signals having the same carrier wavelength arrive simultaneously at the same output port 150.

Example embodiments of wavelength-selective switches that can be used as wavelength-selective switches 120 and/or 140 in device 100 are described in more detail below in reference to FIGS. 2-12. From the provided description, a person of ordinary skill in pertinent art will understand that an example embodiment of a wavelength-selective switch disclosed herein advantageously enables WSS device 100 to have a relatively high port count and/or a relatively low cost per port.

FIGS. 2A-2B show schematic views of a wavelength-selective switch 200 that can be used in the WSS device 100 (FIG. 1) according to an embodiment. For illustration purposes, the schematic view of FIG. 2A can be referred to as the "side view," and the schematic view of FIG. 2B can be referred to as the "top view." The relative orientation of the views is indicated by the XYZ-coordinate triad shown in each of FIGS. 2A and 2B. The X, Y, Z coordinates shown in FIGS. 3-6 are also consistent with the XYZ-coordinate triad of FIGS. 2A-2B.

Switch 200 has a total of P optical ports $202_1$-$202_P$, where P is an integer greater than two. One of optical ports $202_1$-$202_P$ is configured to operate as a common port. Some or all of the remaining optical ports $202_1$-$202_P$ are configured to operate as the M or N ports. In some embodiments, one or more of optical ports $202_1$-$202_P$ may be idle or used for blocking (e.g., dropping) one or more unwanted WDM components. An embodiment of switch 200 having P≥M+1 ports can be used, e.g., as a wavelength-selective switch 120 (FIG. 1). An embodiment of switch 200 having P≥N+1 ports can be used, e.g., as a wavelength-selective switch 140 (FIG. 1).

In the embodiment shown in FIGS. 2A-2B, optical ports $202_1$-$202_P$ are arranged, e.g., in a regularly spaced or irregularly spaced, linear array lined up parallel to the Z-coordinate axis. As a result, the P optical ports $202_1$-$202_P$ appear stacked on top of one another in the top view shown in FIG. 2B. In an example embodiment, an optical port 202 may include a length of optical fiber or waveguide and/or a fiber connector for connecting an external optical fiber. In operation, an optical port 202 may be configured to receive a respective optical WDM signal either from an external optical link or from the interior part of switch 200.

In an alternative embodiment (not shown), ports 202 may be arranged in a regular or irregular two-dimensional array.

Figure 3:
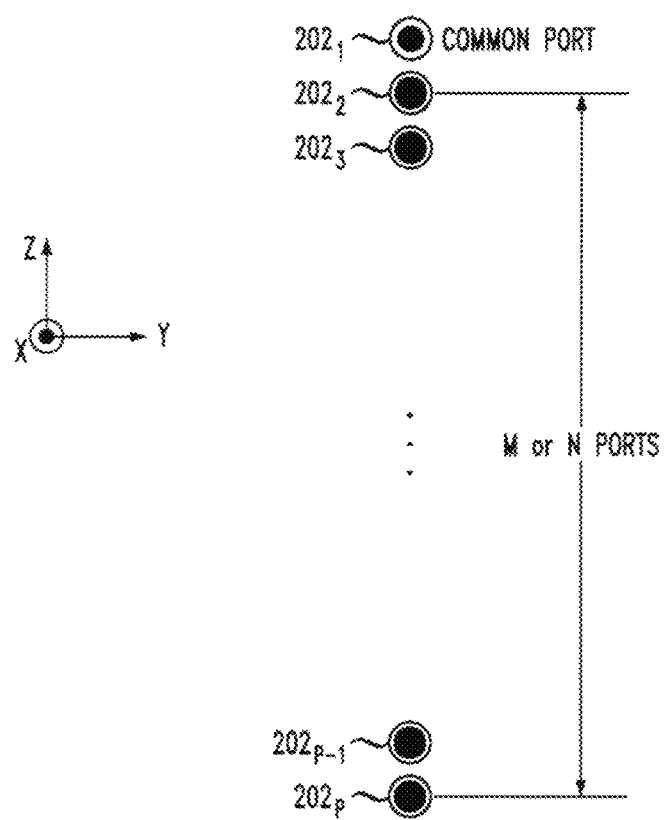
FIG. 3 shows an example arrangement of optical ports in the wavelength-selective switch of FIG. 2 according to an embodiment.

FIG. 3 shows an end view of optical ports $202_1$-$202_P$ along the X-coordinate axis according to an embodiment. In this particular embodiment, the P similar optical ports $202_1$-$202_P$ are arranged in a regularly spaced, linear array oriented parallel to the Z-coordinate axis. Optical port $202_1$ is designated as the common port. In alternative embodiments, other optical-port assignments may be used.

Referring back to FIGS. 2A-2B, switch 200 comprises lenses $230_1$-$230_3$ to provide relay/imaging/focusing optics configured to appropriately optically couple the various constituent optical elements of the switch, e.g., as further explained below. Although each of lenses $230_1$-$230_3$ is illustratively shown in FIGS. 2A-2B as consisting of a single spherical lens, various possible embodiments are not so limited. For example, in a possible alternative embodiment, some or all of lenses $230_1$-$230_2$ may be replaced by any suitable combination of lenses and/or mirrors. Both cylindrical and spherical lenses and/or cylindrical, spherical, and parabolic mirrors may be used. A person of ordinary skill in the art will appreciate that, in some embodiments, wavelength-selective switch 200 may include one or more additional sets of relay/imaging/focusing optics (not explicitly shown in FIGS. 2A-2B).

In the shown embodiment, lenses $230_1$ and $230_2$ are positioned between optical ports $202_1$-$202_P$ and a virtually imaged phase-array (VIPA) disperser 240. In an example embodiment, lenses $230_1$ and $230_2$ are configured to perform one or more of the following optical functions:
 (i) To relay light between optical ports $202_1$-$202_P$ and VIPA disperser 240;
 (ii) To change the beam sizes. For example, it might be beneficial to have a larger or smaller beam size for individual optical beams at VIPA disperser 240 than at optical ports $202_1$-$202_P$; and
 (iii) To accommodate dynamic light switching between optical ports $202_1$-$202_P$ by being a part of an optical imaging system that is configured to image, in a wavelength-dependent manner, each common port onto a corresponding set of other ports, or vice versa. As explained below, another part of said optical imaging system is lens $230_3$. Lens $230_3$ is positioned between the VIPA disperser 240 and an LCOS micro-display 250. The VIPA disperser 240 can alter the spatial spread of light and introduce relative phase shifts between different optical sub-beams. An example structure and principle of operation of the VIPA disperser 240 are described in more detail below in reference to FIG. 4.

A front side 248 of the LCOS micro-display 250 is located in a Fourier plane of lens $230_3$. Lens $230_3$ therefore operates to convert the phase-shifted spatial spread of the optical sub-beams generated by the VIPA disperser 240 into a spatial/angular separation of different WDM components at the front side 248. Thereat, the sub-beams may produce narrow strips of light, with each such strip containing light of the corresponding WDM component. In an example embodiment, each WDM component may produce between two and ten respective narrow strips of light at the front side 248, e.g., as explained below in reference to FIGS. 5 and 6. Each of such strips corresponds to a different respective diffraction order of the optical sub-beams. Illustratively, FIG. 2B shows three such diffraction orders, which are labeled $O_{m-1}$, $O_m$, and $O_{m+1}$, respectively.

Different portions of front side 248 of LCOS micro-display 250 can be individually configured, using a routing controller 260, to impart different respective phase shifts. The pattern of phase shifts so imparted may best be understood as being a result of a hologram displayed by the LCOS micro-display 250. As such, routing controller 260 controls wavelength-dependent beam routing between optical ports $202_1$-$202_P$ by displaying appropriate holograms and, when needed, by changing the displayed holograms.

Lens $230_3$ further operates to relay the light variously steered by the LCOS micro-display 250 back to VIPA disperser 240. VIPA disperser 240 further operates to directionally recombine each of the subsets of the steered light intended for the same output port into a respective recombined optical beam and direct each of the recombined optical beams, via lenses $230_1$-$230_2$, to the respective ones of optical ports $202_1$-$202_P$.

Figure 4:
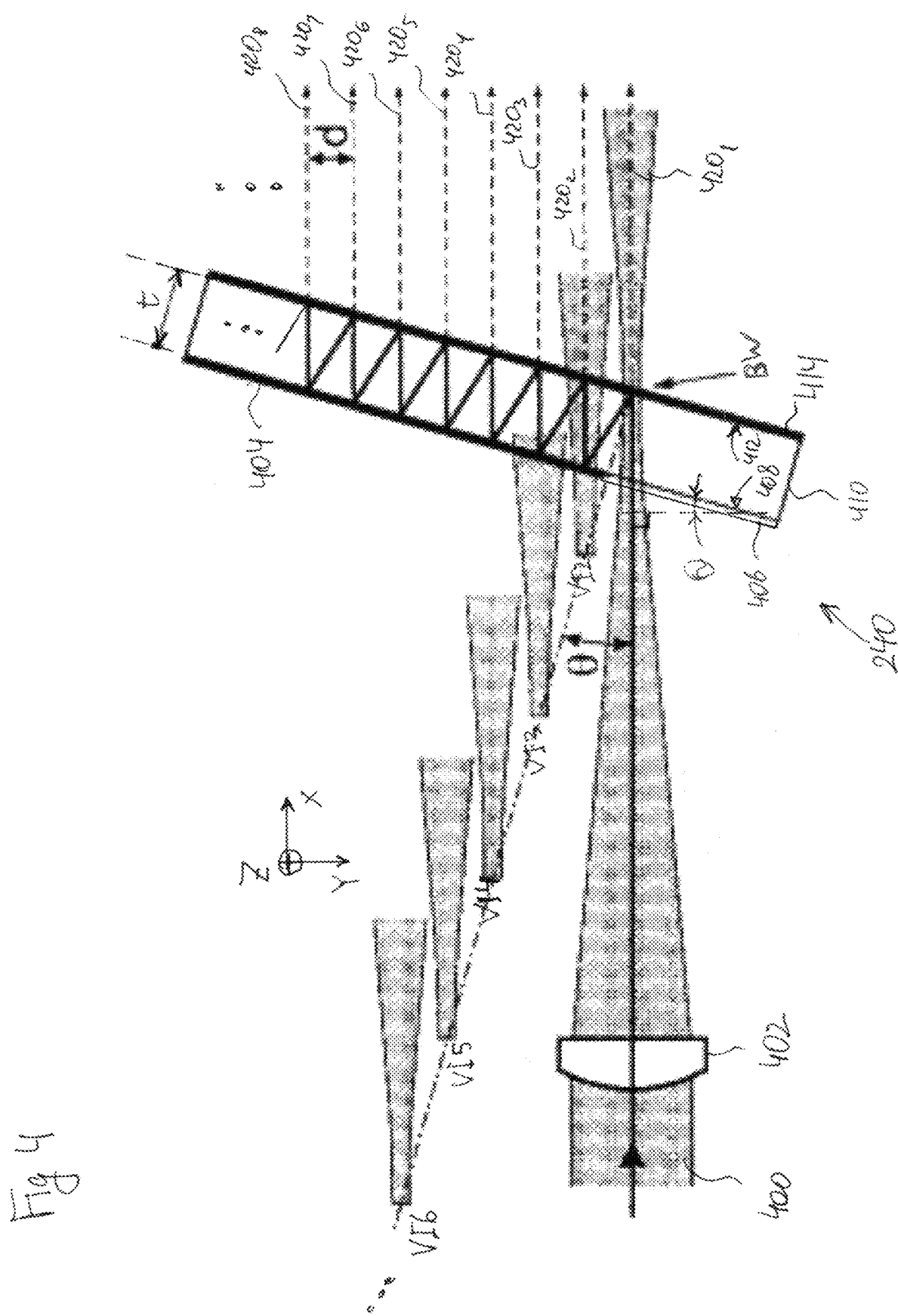
FIG. 4 pictorially illustrates certain optical and physical characteristics of a virtually imaged phase-array (VIPA) disperser that can be used in the wavelength-selective switch of FIG. 2 according to an embodiment.

FIG. 4 pictorially illustrates certain optical and physical characteristics of VIPA disperser 240 according to an embodiment. As shown in FIG. 4, VIPA disperser 240 comprises a transparent-dielectric (e.g., glass) plate 410. Plate 410 is flat and has a constant thickness, t. In an example embodiment, the thickness t can be smaller than 1 mm, e.g., can be approximately 0.1 mm. The opposing main sides of plate 410 are labeled in FIG. 4 using the reference numerals 408 and 412, respectively. Plate sides 408 and 412 are referred to as being the "main" sides because each of them has two relatively large dimensions. Each of the other sides of plate 410 has one relatively large dimension and one relatively small dimension (i.e., t). Collectively, the latter sides of plate 410 may be referred to as edges of the plate.

The plate side 408 has a first portion thereof coated with an anti-reflective (AR) film 406 and has a second portion thereof coated with a highly reflective film 404. In an example embodiment, the highly reflective film 404 may comprise a metal or metal alloy and may have a reflectivity of substantially 100%. The plate side 412 is coated with a partially reflective film 414. In an example embodiment, the partially reflective film 414 may comprise a metal or metal alloy and may have a reflectivity between 50% and 98%.

In some embodiments, the AR film 406 may be absent, and the corresponding portion of the plate side 408 may be bare.

When a collimated optical beam 400 is directed toward VIPA disperser 240 at an incidence angle θ, a lens 402 can be positioned such that the optical beam passes through AR film 406 and is focused on (e.g., has a beam waist BW at) the plate side 414 as indicated in FIG. 4. The focused beam 400 is partially transmitted through and partially reflected back from the partially reflective film 414. The transmitted portion of the focused beam 400 creates a first sub-beam $420_1$. The reflected portion of the focused beam 400 optically reverberates between the reflective films 404 and 414, and the light that leaks through the partially reflective film 414 at each impingement thereupon creates sub-beams $420_2$, $420_3$, ..., $420_8$, and so on. The distance d between the center axes of two adjacent sub-beams 420 depends on the thickness t and the incidence angle θ. In various embodiments, the total number Q of the sub-beams 420 generated in this manner may be, e.g., in the range between Q=10 and Q=500.

The illumination pattern produced by the Q sub-beams 420 generated by the VIPA disperser 240 is similar to that created by Q light sources, which include the light source BW and the plurality of light sources located at the virtual images VI2, VI3, . . . , VI6, etc. of the light source BW. These light sources are characterized by a gradually decreasing optical power due to the gradual leakage of the reverberating light through the partially reflective film 414. This tentative analogy of the optical effect of the VIPA disperser 240 with the optical effect of multiple virtually imaged light sources is captured by the VIPA acronym in the term "VIPA disperser."

Due to its Fabry-Perot etalon geometry, a VIPA disperser 240 is generally capable of providing a much larger angular dispersion compared to that of a conventional (e.g., blazed or ruled) optical grating typically used in conventional WSS devices. For example, a rectangular VIPA disperser 240 having a thickness t=0.5 mm, a first side length of 24 mm (in the wavelength direction), and a second side length of 30 mm (in the port direction) may create more than 400 virtual light sources, i.e, Q>400 (also see FIGS. 2A and 2B for the orientation of the port and wavelength directions). In this particular example, the maximum optical-path-length difference can be more than 40 cm, which corresponds to a 2-ns time delay in fused silica. The inverse of this time delay indicates that the spectral resolution of such a VIPA disperser 240 can potentially approach 0.5 GHz. Advantageously, this spectral resolution is more than ten times finer than that of a conventional optical grating typically used in conventional WSS devices. The free spectral range (FSR) of such a VIPA disperser 240 can be approximately 200 GHz, as determined by the optical-path-length difference between two neighboring virtual sources VI (see FIG. 4). The spectral resolution of the VIPA disperser 240 can potentially be further enhanced, e.g., by undertaking suitable design and configuration changes directed at reducing the FSR.

Figure 5:
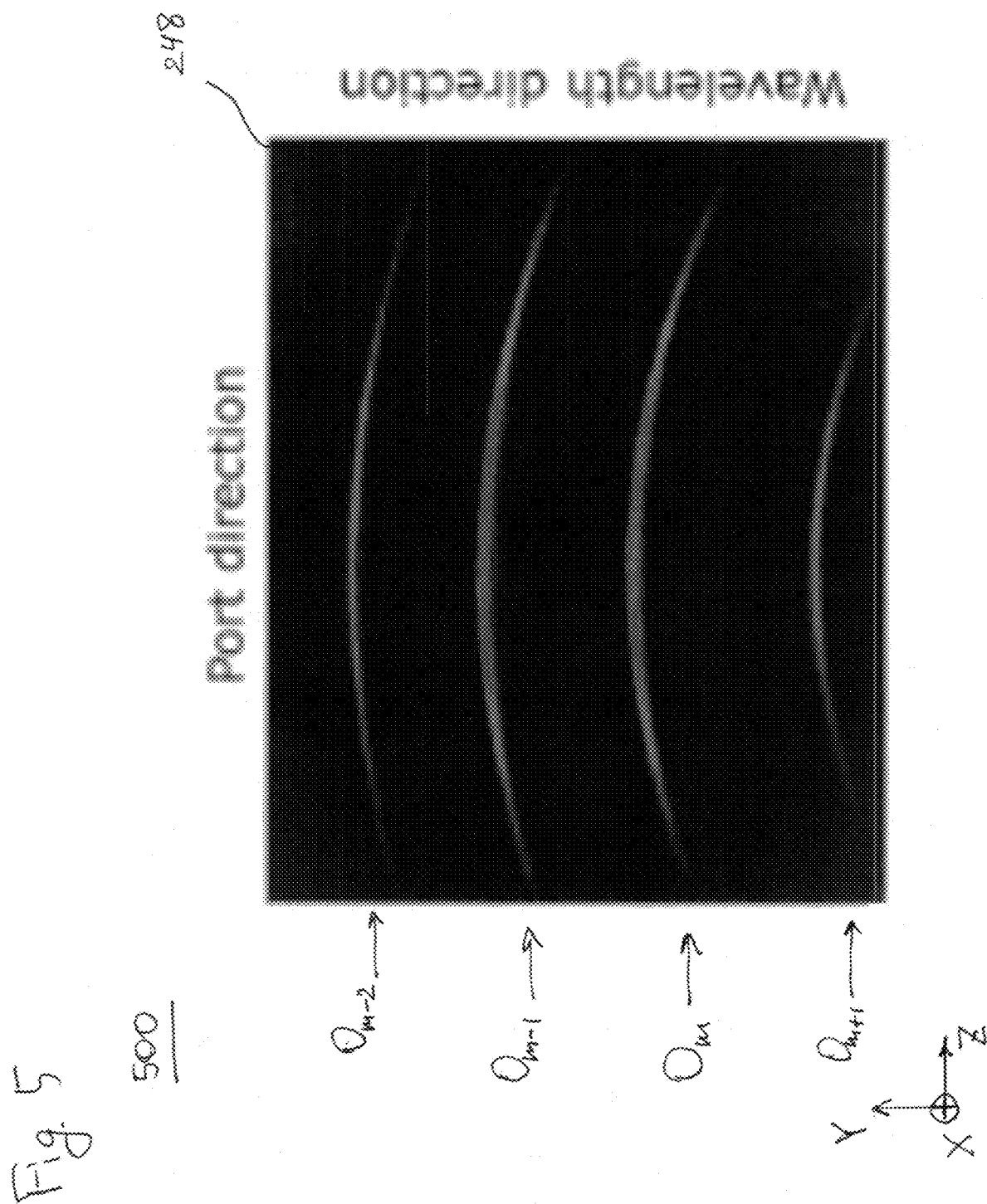
FIG. 5 shows an example illumination pattern that can be created on the liquid-crystal-on-silicon (LCOS) micro-display of the wavelength-selective switch of FIG. 2 according to an embodiment.

FIG. 5 shows an example illumination pattern 500 that can be created on the front side 248 of the LCOS micro-display 250 of switch 200 according to an embodiment. This particular illumination pattern is created by monochromatic (194-THz) CW light delivered through optical port 202₁, which operates as a common port of switch 200 (also see FIG. 3). Four diffraction orders of the light, labeled $O_{m-2}$, $O_{m-1}$, $O_m$, and $O_{m+1}$, are evident in FIG. 5.

Using different respective holograms displayed on the front side 248 by the LCOS micro-display 250, switch 200 may perform the following optical operations on the light: (A) steer substantially all of the monochromatic light to a selected one of optical ports $202_2$-$202_P$ while applying different relative phase shifts to different diffraction orders of the monochromatic light in a manner that causes mainly constructive interference of the light at that optical port, thereby implementing a signal-switching operation; (B) direct light of different diffraction orders of the monochromatic light to different selected optical ports 202, thereby implementing a signal-splitting operation; and (C) apply different relative phase shifts to different diffraction orders of the monochromatic light in a manner that controls the relative degree of constructive and destructive interference of the light at a selected one of optical ports $202_2$-$202_P$, thereby implementing a controllable signal-attenuating operation. With respect to the signal-splitting operation (B), it should be noted that, for the illumination pattern 500, an optical signal may be split into two different optical ports, three different optical ports, or four different optical ports, with the maximum number of target optical ports being equal to (i.e., limited by) the total number of diffraction orders on the front side 248 of the LCOS micro-display 250. With respect to the signal-switching operation (A) and signal-attenuating operation (C), it should be noted that these two operations can be performed in switch 200 independently (from one another). In other words, signal attenuation and port steering are fully isolated (decoupled) from each other in switch 200. This particular feature may be beneficial, e.g., for crosstalk reduction and for avoiding delicate and complicated hologram optimization caused by interdependence of these two operations in conventional WSS devices.

When polychromatic light (e.g., corresponding to two or more different WDM channels) is delivered through optical port 202₁, illumination patterns similar to the illumination pattern of FIG. 5 are created for each constituent wavelength of the polychromatic light in different respective portions of the front side 248 of LCOS micro-display 250. As such, switch 200 can be operated, using controller 260, to independently apply the above-indicated operations (A), (B), and (C) to different WDM channels.

Figure 6:
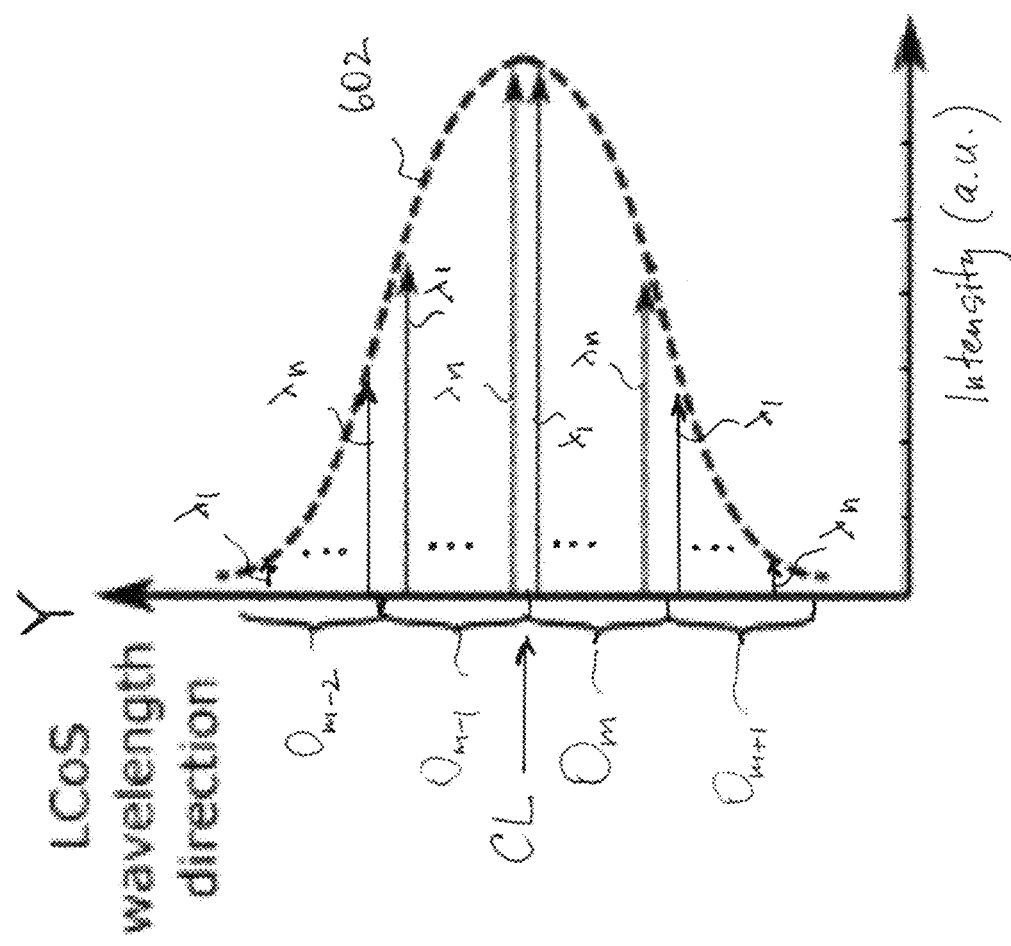
FIG. 6 graphically illustrates spectral characteristics of an output intensity envelope of the VIPA disperser of FIG. 4 in the wavelength-selective switch of FIG. 2 according to an embodiment.

FIG. 6 graphically illustrates spectral characteristics of an output-intensity envelope 602 of the VIPA disperser 240 on the front side 248 of LCOS micro-display 250 in switch 200 according to an embodiment. Output-intensity envelope 602 spans four diffraction orders $O_{m-2}$, $O_{m-1}$, $O_m$, and $O_{m+1}$ (also see FIG. 5). Each of the diffraction orders $O_{m-2}$, $O_{m-1}$, $O_m$, and $O_{m+1}$ is illustratively shown as containing spatially dispersed wavelength components $\lambda_1, \ldots, \lambda_n$. The relative intensities of the spatially dispersed wavelength components $\lambda_1, \ldots, \lambda_n$ follow the output intensity envelope 602 as indicated in FIG. 6. In this particular example, the diffraction orders $O_{m-1}$ and $O_m$ are adjacent to and in symmetric locations on opposite sides of a centerline CL of the front side 248. The diffraction orders $O_{m-2}$ and $O_{m+1}$ are also in symmetric locations on opposite sides of the centerline CL. Such relative positions of the diffraction orders $O_{m-2}$, $O_{m-1}$, $O_m$, and $O_{m+1}$ on the front side 248 may be beneficial in terms of the relative ease of programming controller 260 for implementing the above-mentioned signal-splitting operation (B) and signal-attenuating operation (C).

FIGS. 7-10 graphically show examples of optical transmission characteristics that can be exhibited by switch 200 (FIGS. 2A-2B) according to an embodiment.

Figure 7:
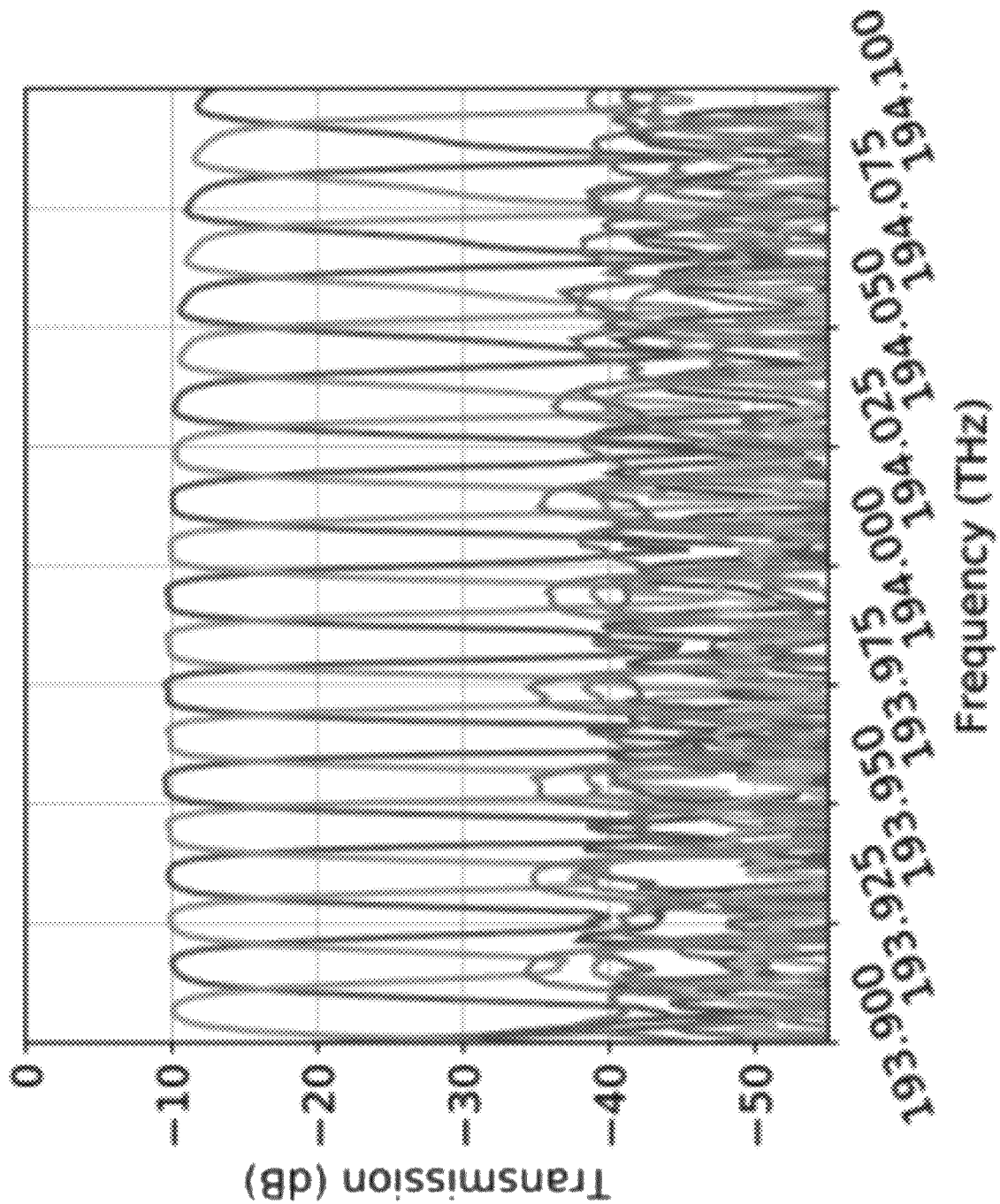
FIGS. 7-10 graphically show examples of transmission characteristics that can be exhibited by the wavelength-selective switch of FIG. 2 according to an embodiment.

FIG. 7 shows a spectral range corresponding to one FSR of the VIPA disperser 240. The shown transmission curves were experimentally measured in a configuration of switch 200 in which optical port 202₁ was the common port to which "white" light (i.e., light having a constant spectral power density across the shown spectral range) was applied. This white light was used to model twenty 10-GHz channels. When consecutively numbered from 1 to 20, these twenty wavelength channels have ten "odd" channels and ten "even" channels. Controller 260 was used to cause the LCOS micro-display 250 to display a hologram that directed the light of odd channels to optical port 202₂ and directed the light of even channels to optical port 202₃. Excellent flat-top transmission bands corresponding to the different channels are evident in FIG. 7.

Figure 8:
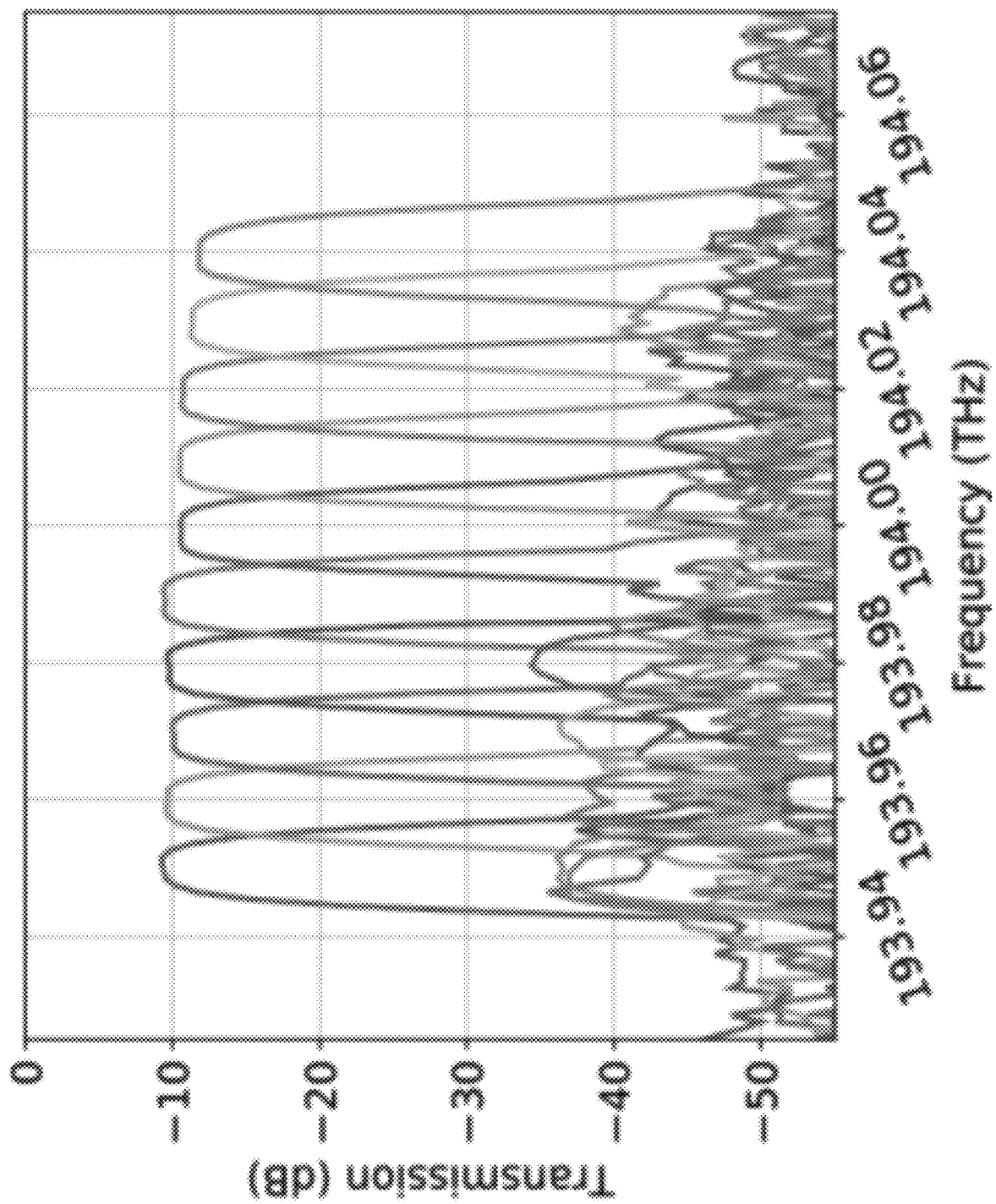

FIG. 8 graphically shows transmission curves experimentally measured in a configuration of switch 200 in which ten consecutive 10-GHz channels of the white light applied to optical port 202₁ were demultiplexed by being directed to optical ports $202_2$-$202_{11}$, respectively. Again, excellent flat-top transmission bands corresponding to the different wavelength channels are evident in FIG. 8.

Figure 9:
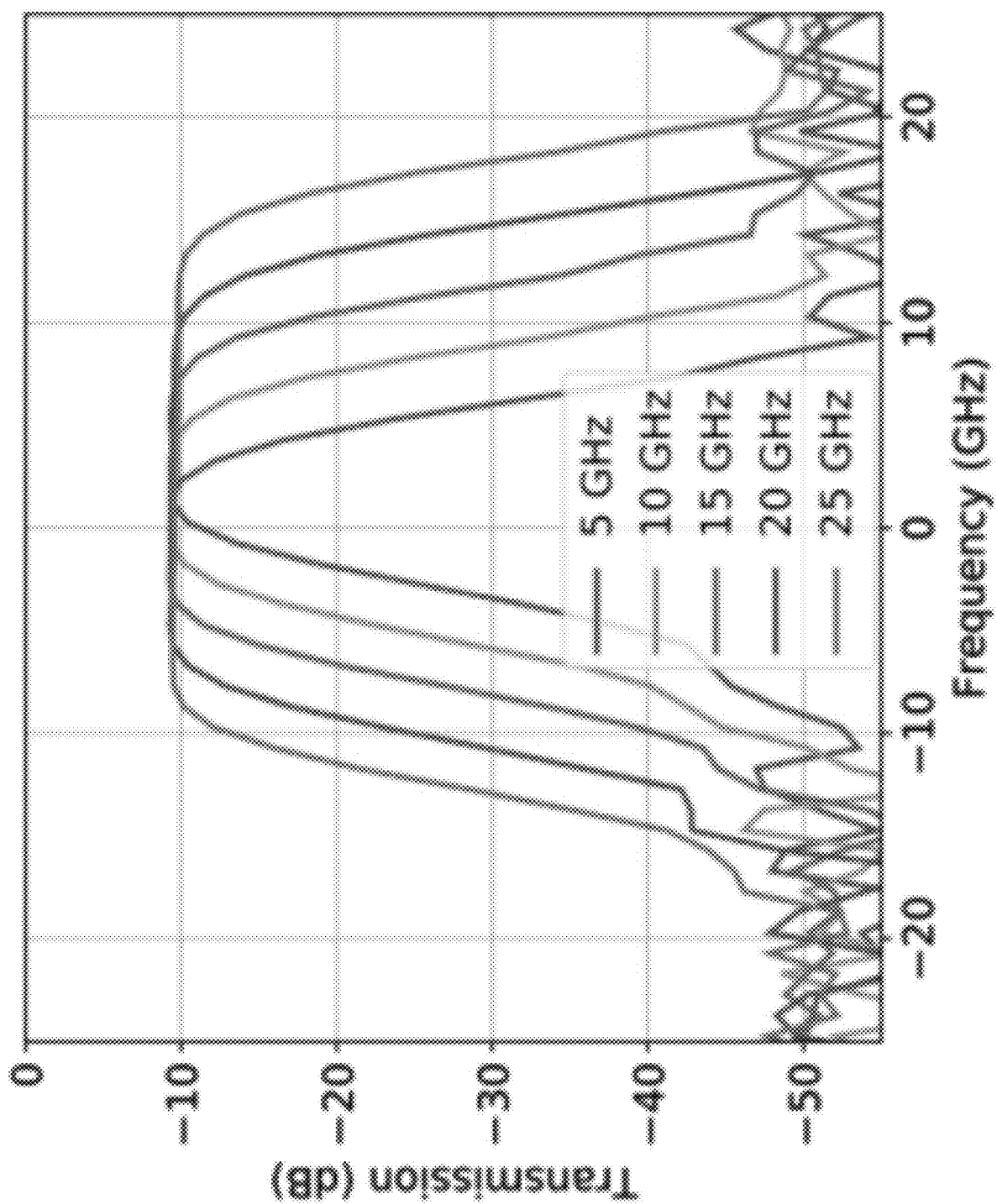

FIG. 9 graphically illustrates an example dependence of the shape of a single transmission band in switch 200 on the band's spectral width, which is indicated in the provided legend. Excellent flat-top transmission-band shapes are evident at least down to the 10-GHz spectral width. The estimated resolution is <3 GHz based on a metric that uses the spectral range within which the band's transmission changes from 90% to 10% with respect to the transmission level of the band's flat top.

Figure 10:
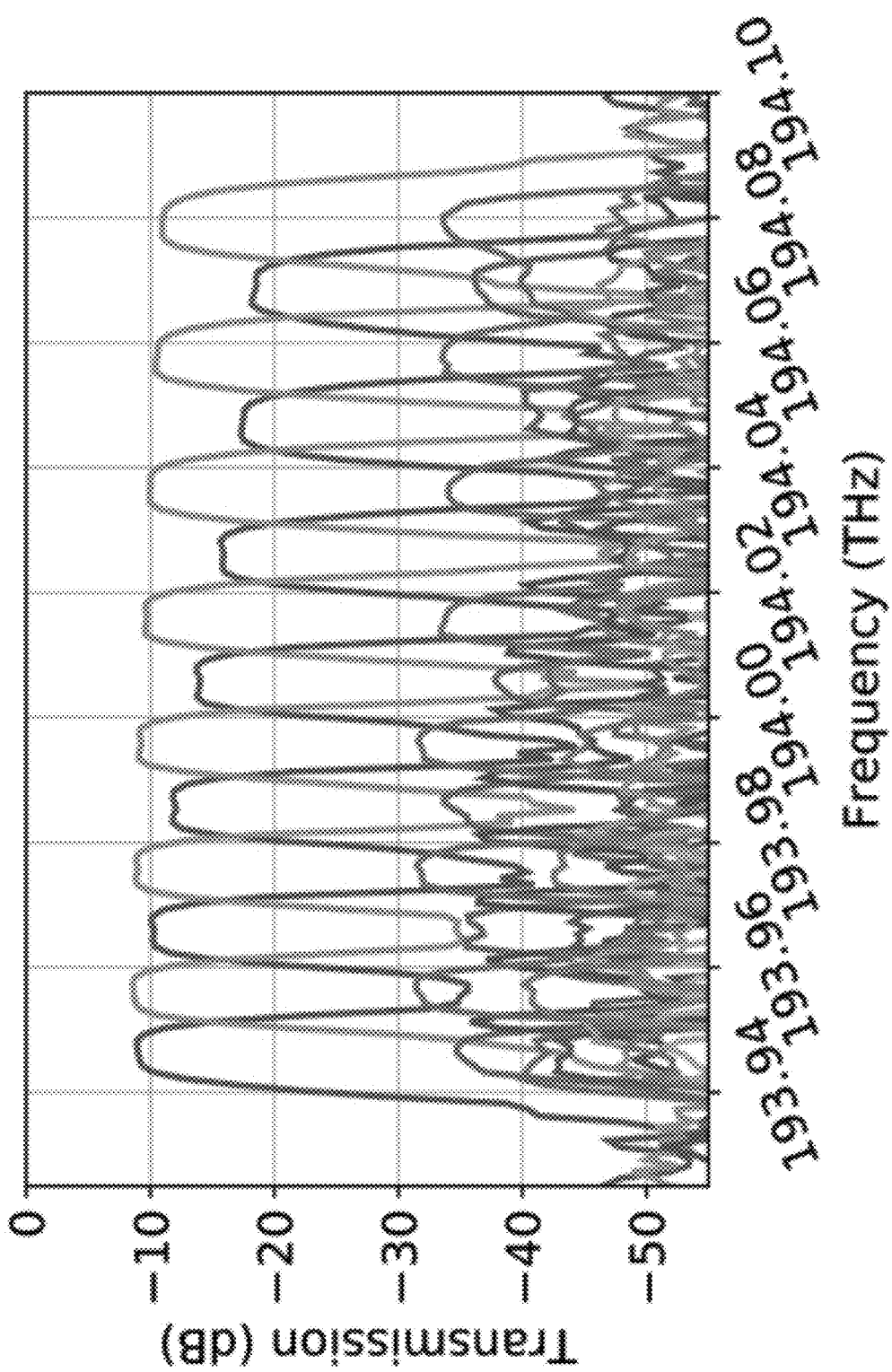

FIG. 10 graphically shows transmission curves experimentally measured in a configuration of switch 200 in which fourteen 10-GHz channels were de-interleaved such that the light of odd channels was directed to optical port $202_2$ and the light of even channels was directed to optical port $202_3$. In addition, the odd channels were gradually attenuated with 1.5 dB increments. The results of FIG. 10 clearly show that signal attenuation and port steering can be decoupled from each other in switch 200.

Figure 11:
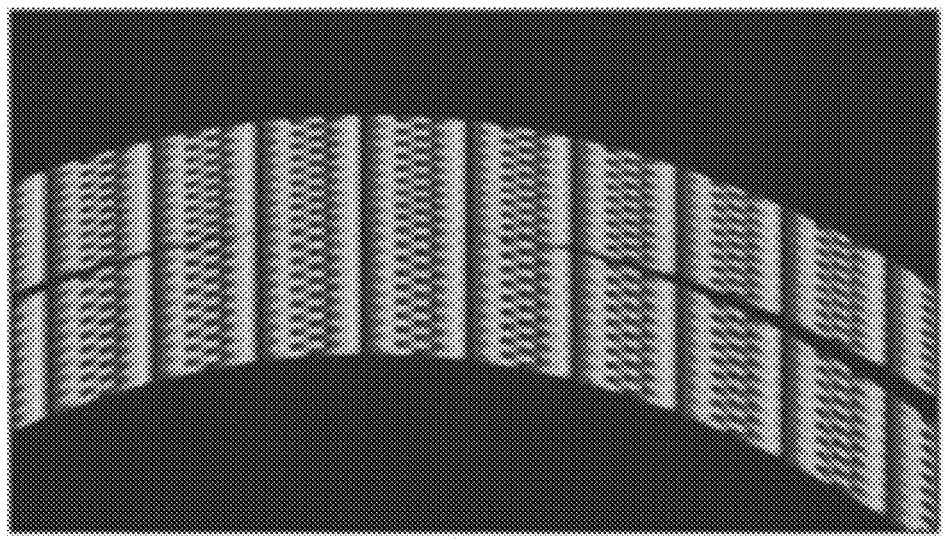
FIGS. 11-12 show example LCOS holograms that can be used in the wavelength-selective switch of FIG. 2 according to an embodiment.
Figure 12:
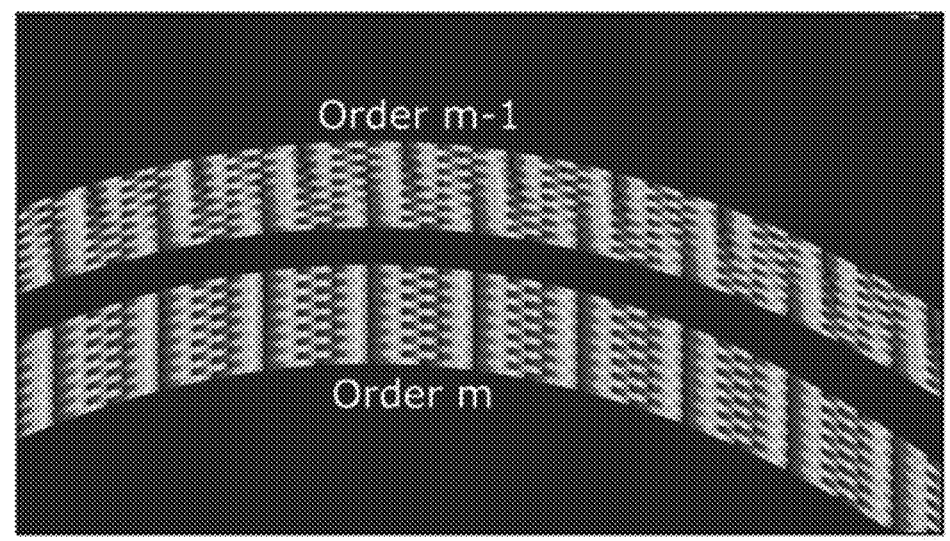

FIGS. 11-12 show example LCOS holograms that can be used in switch 200 according to an embodiment. More specifically, FIG. 11 shows the LCOS hologram that was used in the switch configuration corresponding to FIG. 7. FIG. 12 shows the LCOS hologram that was used in the switch configuration corresponding to FIG. 10. Both of the shown holograms were displayed on the front side 248 of LCOS micro-display 250 by appropriately configuring individual pixels of the LCOS micro-display. In both examples, only the diffraction orders $O_{m-1}$ and $O_m$ are used for light steering.

According to an example embodiment disclosed above, e.g., in the summary section and/or in reference to any one or any combination of some or all of FIGS. 1-12, provided is an apparatus comprising: an array of optical ports (e.g., $202_1$-$202_P$, FIGS. 2A, 2B, 3) including a first optical port (e.g., $202_1$, FIGS. 2A, 2B, 3) and a plurality of second optical ports (e.g., $202_2$-$202_P$, FIGS. 2A, 3); a beam-steering device (e.g., 250, FIGS. 2A-2B) optically coupled to the array of optical ports and having a beam-steering surface (e.g., 248, FIGS. 2A-2B) including a plurality of configurable pixels; and a virtually imaged phase-array (VIPA) disperser (e.g., 240, FIGS. 2A, 2B, 4) optically coupled between the array of optical ports and the beam-steering device; and wherein the apparatus is configurable to selectively route a plurality of wavelength channels between the first optical port and a selected set of the second optical ports by way of the VIPA disperser and the beam-steering surface.

In some embodiments of the above apparatus, the VIPA disperser comprises an optically transparent plate (e.g., 410, FIG. 4) having opposing first and second main sides (e.g., 408, 412, FIG. 4), the first main side having an optically transparent first portion and having a second portion thereof coated with a highly reflective film (e.g., 404, FIG. 4), the second main side being coated with a partially reflective film (e.g., 414, FIG. 4).

In some embodiments of any of the above apparatus, the optically transparent plate is oriented to cause light received from the first optical port to optically reverberate between the highly reflective film and the partially reflective film after entering the optically transparent plate through the optically transparent first portion.

In some embodiments of any of the above apparatus, the optically reverberating light undergoes at least 100 reflections from the highly reflective film (e.g., Q>100).

In some embodiments of any of the above apparatus, the optically transparent first portion of the first main side is coated with an anti-reflective film (e.g., 406, FIG. 4).

In some embodiments of any of the above apparatus, the VIPA disperser is configured to produce two or more diffraction orders (e.g., $O_{m-2}$, ..., $O_{m+1}$, FIG. 5) on the beam-steering surface.

In some embodiments of any of the above apparatus, the beam-steering device is configurable to independently process light corresponding to different ones of the diffraction orders.

In some embodiments of any of the above apparatus, the beam-steering device is configurable to implement optical-signal switching (e.g., operation (A) described in reference to FIG. 5) by applying different relative phase shifts to light of different ones of the diffraction orders corresponding to a selected one of the wavelength channels to cause mainly constructive interference of the light at a selected one of the second optical ports.

In some embodiments of any of the above apparatus, the beam-steering device is configurable to implement optical-signal splitting (e.g., operation (B) described in reference to FIG. 5) by steering light of different ones of the diffraction orders corresponding to a selected one of the wavelength channels to at least two different selected ones of the second optical ports.

In some embodiments of any of the above apparatus, the beam-steering device is configurable to implement controllable optical-signal attenuation (e.g., operation (C) described in reference to FIG. 5) by applying different relative phase shifts to different ones of the diffraction orders corresponding to a selected one of the wavelength channels to control a relative degree of constructive and destructive interference of the light at a selected one of second optical ports.

In some embodiments of any of the above apparatus, the beam-steering device is configurable to perform optical-signal switching and controllable optical-signal attenuation independently of one another.

In some embodiments of any of the above apparatus, the VIPA disperser is configured to produce at least four diffraction orders (e.g., $O_{m-2}$, ..., $O_{m+1}$, FIG. 5) on the beam-steering surface.

In some embodiments of any of the above apparatus, the plurality of configurable pixels comprise pixels of a liquid-crystal-on-silicon (LCOS) micro-display (e.g., 250, FIGS. 2A-2B).

In some embodiments of any of the above apparatus, the apparatus further comprises an electronic controller (e.g., 260, FIG. 2B) to cause the LCOS micro-display to display a hologram (e.g., FIGS. 11-12).

In some embodiments of any of the above apparatus, the electronic controller is configured to cause the LCOS micro-display to change the hologram.

In some embodiments of any of the above apparatus, the apparatus further comprises imaging optics (e.g., $230_1$-$230_3$, FIGS. 2A-2B) interposed between the array of optical ports and the beam-steering surface of the beam-steering device such that the beam-steering surface is located in a Fourier plane of the imaging optics.

In some embodiments of any of the above apparatus, the VIPA disperser has a free spectral range smaller than 200 GHz.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

For the purposes of this specification, a MEMS device is a device having two or more parts adapted to move relative to one another, where the motion is based on any suitable interaction or combination of interactions, such as mechanical, thermal, electrical, magnetic, optical, and/or chemical interactions. MEMS devices are fabricated using micro- or smaller fabrication techniques (including nano-fabrication techniques) that may include, but are not necessarily limited to: (1) self-assembly techniques employing, e.g., self-assembling monolayers, chemical coatings having high affinity to a desired chemical substance, and production and saturation of dangling chemical bonds and (2) wafer/material processing techniques employing, e.g., lithography, chemical vapor deposition, patterning and selective etching of materials, and treating, shaping, plating, and texturing of surfaces. The scale/size of certain elements in a MEMS device may be such as to permit manifestation of quantum effects. Examples of MEMS devices include, without limitation, NEMS (nano-electromechanical systems) devices, MOEMS (micro-opto-electromechanical systems) devices, micromachines, microsystems, and devices produced using microsystems technology or microsystems integration.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Throughout the detailed description, the drawings, which are not to scale, are illustrative only and are used in order to explain, rather than limit the disclosure. The use of terms such as height, length, width, top, bottom, is strictly to facilitate the description of the embodiments and is not intended to limit the embodiments to a specific orientation. For example, height does not imply only a vertical rise limitation, but is used to identify one of the three dimensions of a three dimensional structure as shown in the figures. Such "height" would be vertical where the electrodes are horizontal but would be horizontal where the electrodes are vertical, and so on.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

"SUMMARY OF SOME SPECIFIC EMBODIMENTS" in this specification is intended to introduce some example embodiments, with additional embodiments being described in "DETAILED DESCRIPTION" and/or in reference to one or more drawings. "SUMMARY OF SOME SPECIFIC EMBODIMENTS" is not intended to identify essential elements or features of the claimed subject matter, nor is it intended to limit the scope of the claimed subject matter.

What is claimed is:

1. An apparatus, comprising:
   an array of optical ports including a first optical port and a plurality of second optical ports;
   a beam-steering device optically coupled to the array of optical ports and having a beam-steering surface including a plurality of configurable pixels; and
   a virtually imaged phase-array (VIPA) disperser optically coupled between the array of optical ports and the beam-steering device, wherein:
   the apparatus is configurable to selectively route a plurality of wavelength channels between the first optical port and a selected set of the second optical ports by way of the VIPA disperser and the beam-steering surface;
   the beam-steering device is a micro-display comprising the plurality of configurable pixels;
   the VIPA disperser is configured to produce two or more diffraction orders; and
   the beam-steering device is configured to receive the two or more diffraction orders and implement controllable optical-signal attenuation by applying different relative phase shifts to different ones of the diffraction orders corresponding to a selected one of the wavelength channels to control a relative degree of constructive and destructive interference of the light at a selected one of the second optical ports.

2. The apparatus of claim 1, wherein the VIPA disperser comprises an optically transparent plate having opposing first and second main sides, the first main side having an optically transparent first portion and having a second portion thereof coated with a highly reflective film, the second main side being coated with a partially reflective film.

3. The apparatus of claim 2, wherein the optically transparent plate is oriented to cause light received from the first optical port to optically reverberate between the highly reflective film and the partially reflective film after entering the optically transparent plate through the optically transparent first portion.

4. The apparatus of claim 3, wherein the optically reverberating light undergoes at least 100 reflections from the highly reflective film.

5. The apparatus of claim 2, wherein the optically transparent first portion of the first main side is coated with an anti-reflective film.

6. The apparatus of claim 1, wherein the beam-steering device is configurable to independently process light corresponding to different ones of the diffraction orders.

7. The apparatus of claim 1, wherein the beam-steering device is configurable to implement optical-signal switching by applying different relative phase shifts to light of different ones of the diffraction orders corresponding to a selected one of the wavelength channels to cause mainly constructive interference of the light at a selected one of the second optical ports.

8. The apparatus of claim 1, wherein the beam-steering device is configurable to implement optical-signal splitting by steering light of different ones of the diffraction orders corresponding to a selected one of the wavelength channels to at least two different selected ones of the second optical ports.

9. The apparatus of claim 1, wherein the beam-steering device is configurable to perform optical-signal switching and controllable optical-signal attenuation independently of one another.

10. The apparatus of claim 1, wherein the VIPA disperser is configured to produce at least four diffraction orders on the beam-steering surface.

11. The apparatus of claim 1, wherein the micro-display is a liquid-crystal-on-silicon (LCOS) micro-display.

12. The apparatus of claim 11, further comprising an electronic controller to cause the LCOS micro-display to display a hologram.

13. The apparatus of claim 12, wherein the electronic controller is configured to cause the LCOS micro-display to change the hologram.

14. The apparatus of claim 1, further comprising imaging optics interposed between the array of optical ports and the beam-steering surface of the beam-steering device such that the beam-steering surface is located in a Fourier plane of the imaging optics.

15. The apparatus of claim 1, wherein the VIPA disperser has a free spectral range smaller than 200 GHz.

16. The apparatus of claim 1, wherein:
the array of optical ports are distributed in a linear array;
the plurality of configurable pixels at the beam-steering surface of the beam-steering device are arranged in a two-dimensional array; and
light corresponding to the array of optical ports is distributed by optical port in a first dimension of the two-dimensional array of configurable pixels and by wavelength in a second dimension of the two-dimensional array.

17. The apparatus of claim 1, wherein the apparatus is configured to route (i) incoming light having different diffraction orders from the first optical port to different second optical ports and (ii) incoming light having different orders from different second optical ports to the first optical port.

18. The apparatus of claim 1, wherein:
the array of optical ports, the beam-steering device, and the VIPA disperser are part of a wavelength-selective switch (WSS); and
the apparatus comprises first and second pluralities of instances of the WSS, wherein each second optical port of each WSS of the first plurality is connected to a second optical port of a different WSS of the second plurality.

19. The apparatus of claim 18, wherein the number of WSSs in the first plurality is different from the number of WSSs in the second plurality.

\* \* \* \* \*